No. 886,427.

PATENTED MAY 5, 1908.

E. T. SHORTT.
COFFEE ROASTER.
APPLICATION FILED MAY 28, 1907.

4 SHEETS—SHEET 2.

WITNESSES:
L. L. Mead,
W. A. Alexander.

INVENTOR
E. T. Shortt
BY
ATTORNEYS

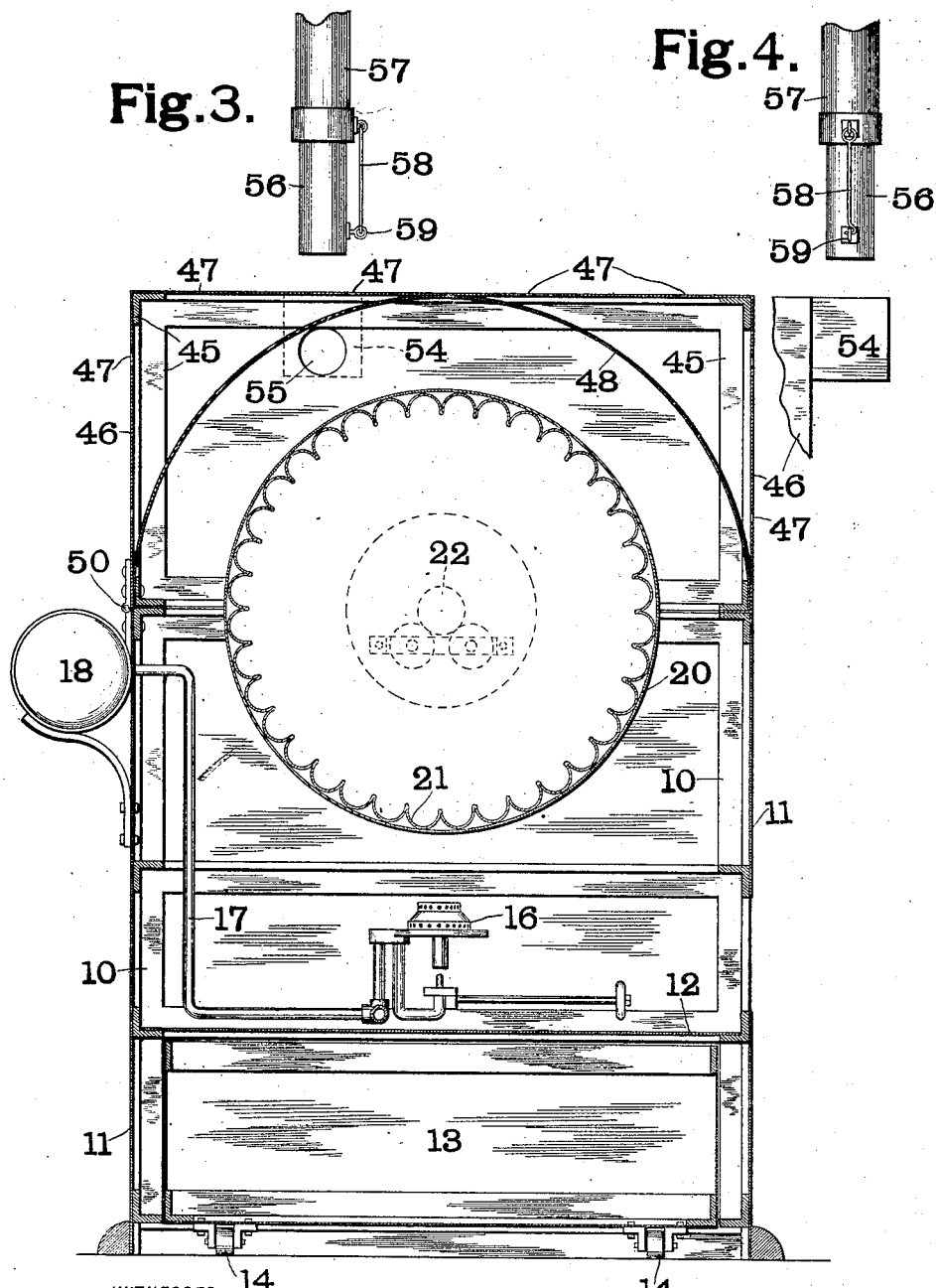

No. 886,427. PATENTED MAY 5, 1908.
E. T. SHORTT.
COFFEE ROASTER.
APPLICATION FILED MAY 28, 1907.

4 SHEETS—SHEET 4.

WITNESSES:
L. L. Mead.
W. A. Alexander.

INVENTOR
E. T. Shortt
BY
ATTORNEYS

UNITED STATES PATENT OFFICE.

EVERETT T. SHORTT, OF ST. LOUIS, MISSOURI.

COFFEE-ROASTER.

No. 886,427.

Specification of Letters Patent.

Patented May 5, 1908.

Application filed May 28, 1907. Serial No. 376,098.

*To all whom it may concern:*

Be it known that I, EVERETT T. SHORTT, a citizen of the United States, residing at St. Louis, in the State of Missouri, have invented a certain new and useful Coffee-Roaster, of which the following is such a full, clear, and exact description as will enable any one skilled in the art to which it appertains to make and use the same, reference being had to the accompanying drawings, forming part of this specification.

My invention relates to roasters for coffee and the like, and more particularly to apparatus of large size for use by grocers or others handling roasted coffee in large quantities.

Figure 1:
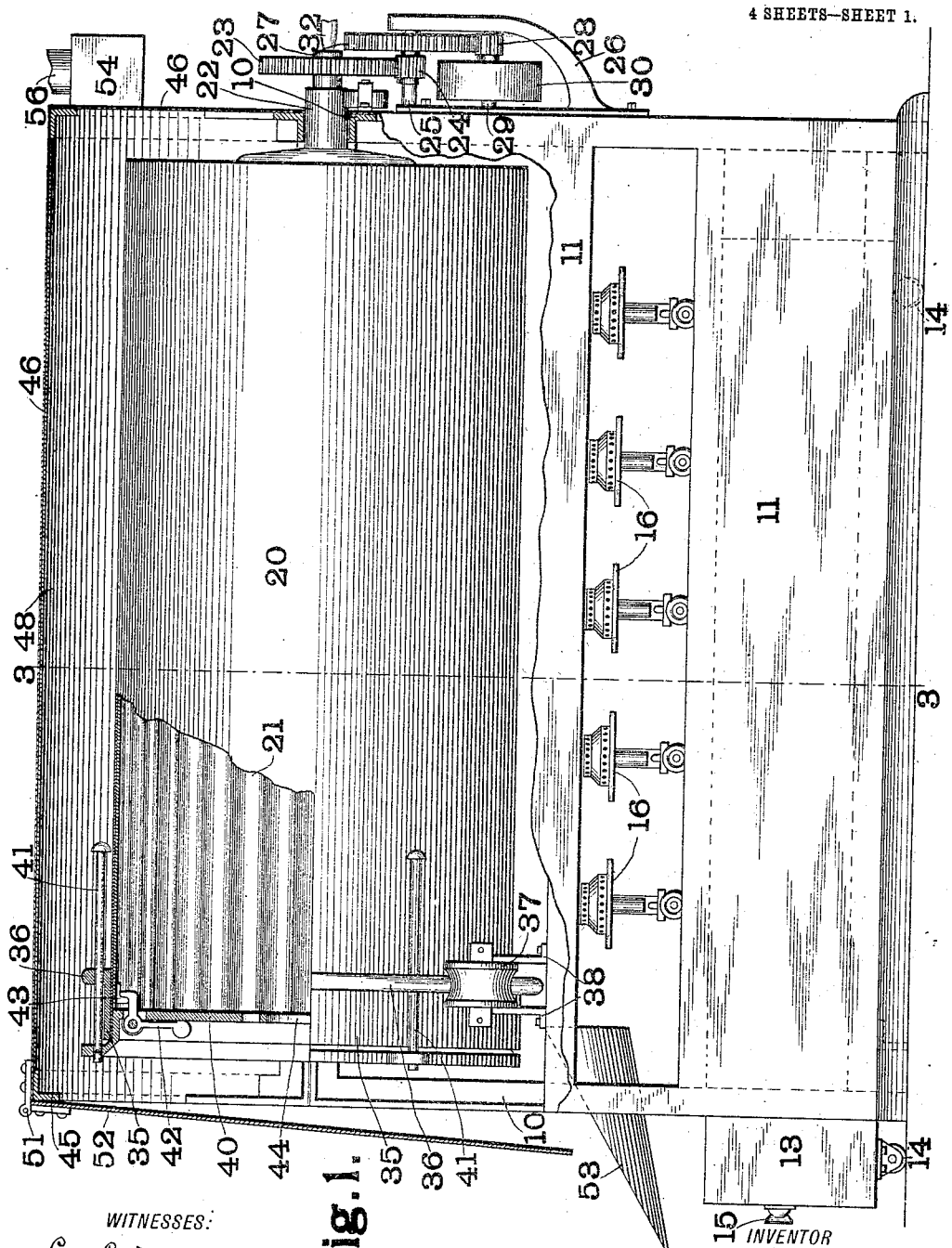
Figure 2:
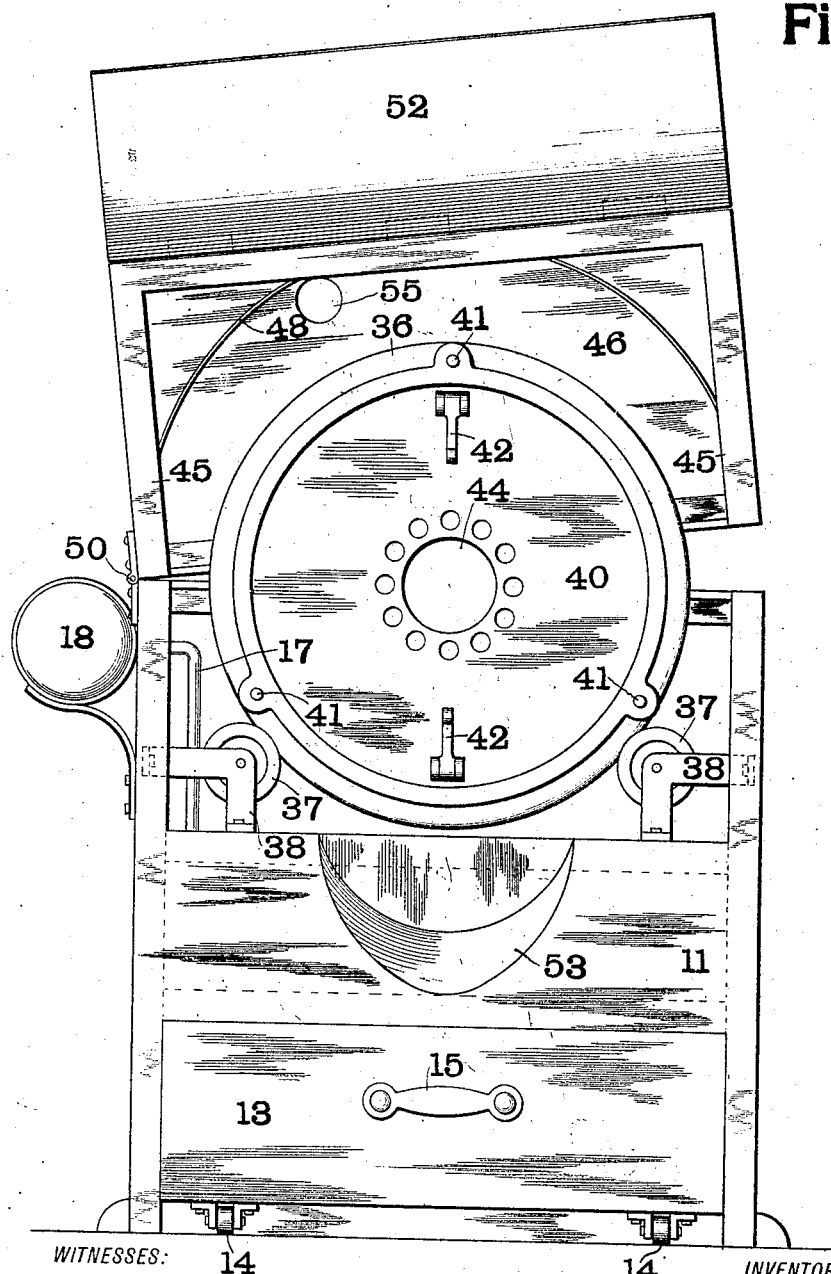
Figure 5:
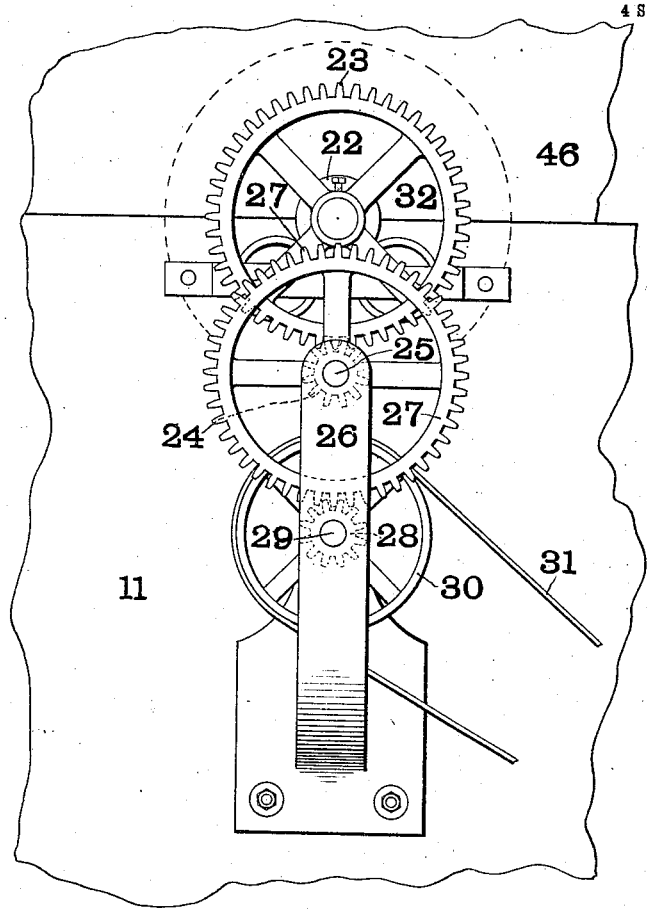

In the accompanying drawings, which illustrate one form of apparatus made in accordance with my invention, Figure 1 is a side view, partly in elevation and partly in section, Fig. 2 is an end view, Fig. 3 is a section on the line 3—3 of Fig. 1, Fig. 4 is a detailed view of the flue connection and Fig. 5 is an enlarged detailed view of the gearing for rotating the cylinder.

Like marks of reference refer to similar parts in the several views of the drawings.

The roasting cylinder and other parts of the apparatus are contained within a casing consisting preferably of a frame work 10 of angle iron and a metallic sheathing 11. The casing 10 is provided at some distance from the base of the apparatus with a partition 12, as best shown in Fig. 3. Below this partition 12 is a sliding receptacle 13 in the form of a drawer. In order to allow the free movement of the receptacle 13 it is provided with rollers 14. The handle 15 is also preferably placed at the end of the receptacle.

Above the partition 12 is arranged the heating device which preferably consists of a number of burners 16. These burners 16 are connected by means of a supply pipe 17 with a tank 18 carried at the rear of the casing and adapted to contain gasolene or other fuel for the burners 16. Arranged within the casing above the burners 16 is a roasting cylinder 20. This cylinder 20 is formed of sheet metal and is preferably provided with a corrugated lining 21 like that described in United States Letters Patent No. 776,358 granted to me November 29, 1904. The cylinder 20 is provided at one end with a trunnion 22 resting in a bearing in the end of the casing. This trunnion 22 is provided with a gear wheel 23 normally meshing with a small gear 24 rigidly mounted on the shaft 25.

This shaft 25 is journaled in a bracket 26 secured at the end of the casing and has secured to it a second gear wheel 27. This gear wheel 27 meshes with a small gear 28 which is rigidly mounted upon a shaft 29 also journaled in the bracket 26. Mounted on the shaft 29 is a pulley 30 which is driven by means of a belt 31 extending to any suitable motor (not shown). The trunnion 22, hereinbefore referred to, is also preferably provided with a handle 32 by means of which the cylinder 20 may be conveniently tilted.

The opposite end of the cylinder 20 from the trunnion 22 is provided with a ring 35 carrying a flange 36. This flange 36 rests upon grooved rolls 37 journaled in brackets 38 carried by the casing. This end of the cylinder 20 is also provided with an end cap 40. This end cap 40 is provided with rods 41, preferably three in number, which extend through the flange 36 so as to form a sliding mounting for the end cap 40. Catches 42 are provided which are adapted to engage with detents 43 carried by the cylinder 20 so as to firmly lock the cap to the cylinder during the time the apparatus is in operation. The end cap 40 is provided at its center with an opening 44 adapted to give access to the cylinder during the operation of roasting in order that the coffee may be sampled to determine whether or not the process of roasting has been completed. The casing is provided with a cover consisting of an angle iron frame 45 and a metallic sheathing 46. The metallic sheathing 46 of the cover is provided with perforations 47. Within the sheathing 46 is a lining 48 preferably semi-cylindrical in form. The use of this lining 48 forms the air space between the lining and the sheathing 46 so as to prevent the undue heating of the cover by the upwardly ascending heated gases. The cover 40 is hinged at 50 to the main portion of the casing. The cover adjacent to the end cap 40 of the cylinder has hinged to it at 51 an end piece 52. This end piece 52 extends down further than the main portion of the cover, as best shown in Fig. 1, so that by swinging the end piece 52 on its hinge 51 the entire end of the cylinder may be exposed. Arranged below the hinged end piece 52 is a chute 53 adapted to receive the coffee from the cylinder 20 and guide it into the receptacle 13 when the said receptacle is partially withdrawn from the casing. In order to convey the heated gases from the cover 46, this cover 46 is provided with an extension 54 communicating with the space within the lining 48 through an opening 55, as shown in Fig. 3. This extension 54 is adapted to be connected with a telescoping portion 56 of the flue 57. By telescoping the portion 56 within the flue 57, the cover 46 may be swung on its pivot 50. In order to retain the part 56 in its raised position, the flue 57 is provided with a hook 58 and the part 56 is provided with an eye 59, as shown in Figs. 3 and 4.

In the operation of my apparatus, the coffee or other material to be roasted is placed within the cylinder 20 and the cover 46 is swung into its closed position and the end piece 52 is also closed. In addition to this, the telescoping portion of the flue 57 is connected with the extension 54 of the cover. Power is now applied to the pulley 30 so as to rotate the cylinder 20 and the burners 16 are lighted. During the operation of roasting the end piece 52 may be swung on its hinge so as to allow samples to be taken through the opening 44. As soon as the operation of roasting has been completed the flue is disconnected from the extension 54 and the cover 46 swung back on its hinge 50 so as to expose the cylinder. The receptacle 13 is now drawn out of the casing a sufficient distance to enable it to receive the coffee from the chute 53 after which the catches 42 are disengaged from the detents 43 and the cylinder tilted upon the rolls 37 by raising the opposite end of the cylinder by means of the handle 32. This will allow the end cap 40 to slide away from the cylinder and discharge the coffee into the chute 53 from whence it passes into the receptacle 13'.

Having fully described my invention, what I claim as new and desire to secure by Letters Patent of the United States is:

1. In a coffee roaster or the like, the combination with a revolubly mounted roasting cylinder, of a casing for said cylinder, a slidingly mounted end cap for said cylinder, and means for tilting said cylinder to discharge the contents thereof.

2. In a coffee roaster or the like, the combination with a casing, of a roasting cylinder within said casing, rolls revolubly supporting one end of said cylinder, said rolls serving as a fulcrum upon which said cylinder may be tilted to discharge the contents thereof, and a heating device in said casing below said cylinder.

3. In a coffee roaster or the like, the combination with a roasting cylinder, of a casing for said cylinder, rolls revolubly supporting one end of said cylinder, and a slidingly mounted cap for said end, said rolls forming a fulcrum upon which said cylinder may be tilted to discharge the contents thereof.

4. In a coffee roaster or the like, the combination with a roasting cylinder, of a casing for said cylinder, means for revolubly and pivotally mounting one end of said cylinder, gearing carried by said casing adjacent to the other end of said cylinder, and a wheel carried by said cylinder and engaging with said gearing.

5. In a coffee roaster or the like, the combination with a roasting cylinder, of a casing for said cylinder, a flange adjacent to one end of said cylinder, rolls revolubly supporting said flange, guide rods slidingly mounted in said flange, and a cap on said rods.

6. In a coffee roaster or the like, the combination with a roasting cylinder, of a casing for said cylinder, said casing being provided with a perforated cover movable with respect to the body of the casing to give access to the cylinder, a lining for said cover forming an air space between itself and the walls of the cover, and a heating device situated within said casing below said cylinder.

7. In a coffee roaster or the like, the combination with a casing, of a roasting cylinder revolubly and tiltingly mounted in said casing, a heating device in said casing below said cylinder, and a receptacle slidingly mounted in said casing below said heating device and adapted to project longitudinally from the casing to receive the contents of said cylinder when the latter is tilted.

8. In a coffee roaster or the like, the combination with a casing, of a cylinder revolubly and tiltingly mounted in said casing, a heating device in said casing below said cylinder, a receptacle slidingly mounted in said casing below said heating device and adapted to receive the contents of said cylinder, and gearing for driving said cylinder.

In testimony whereof, I have hereunto set my hand and affixed my seal in the presence of the two subscribing witnesses.

EVERETT T. SHORTT. [L. S.]

Witnesses:
W. A. ALEXANDER,
ELIZABETH BAILEY.